Patented Nov. 26, 1929

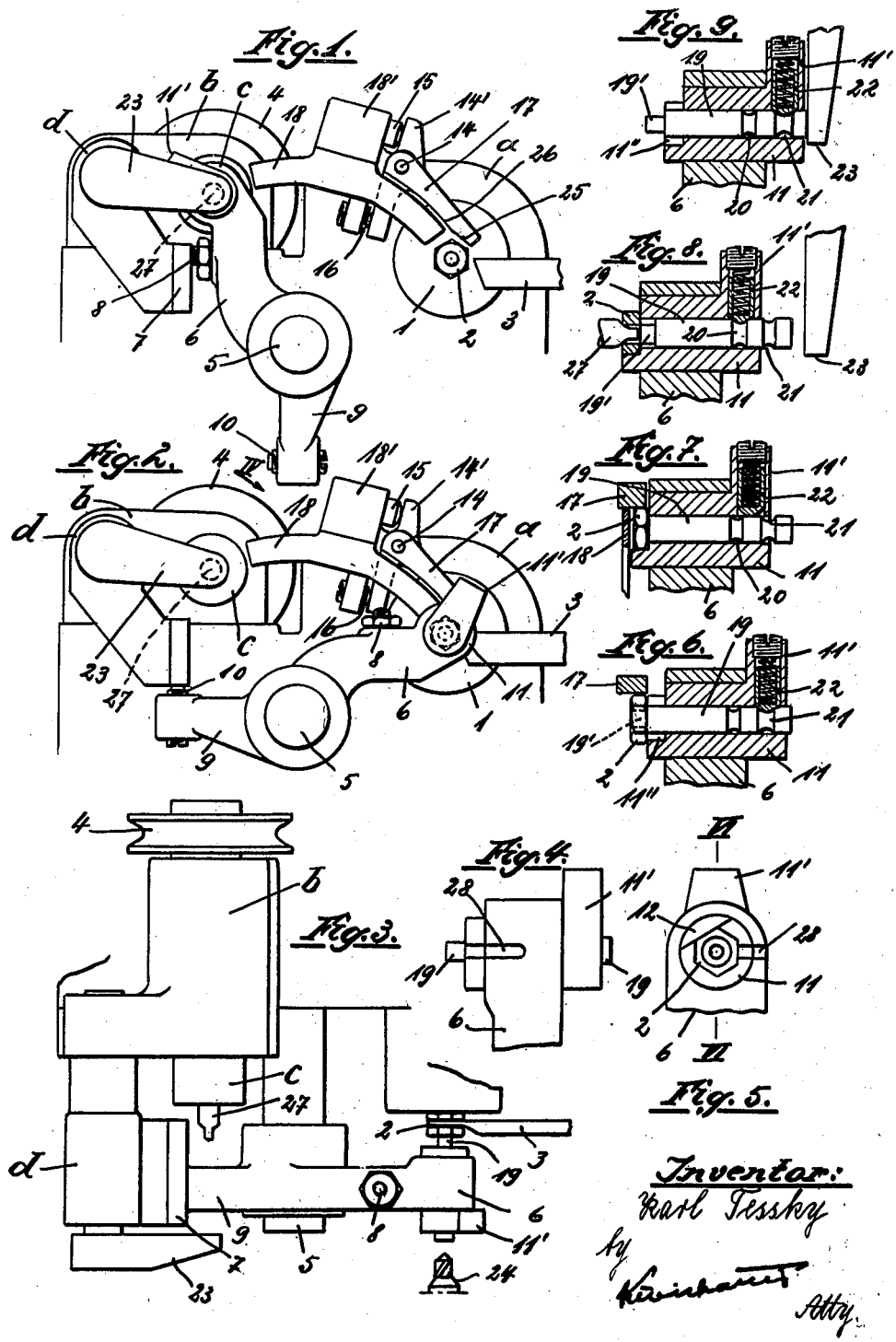

1,737,208

UNITED STATES PATENT OFFICE.

KARL TESSKY, OF ESSLINGEN-ON-THE-NECKAR, GERMANY

BLANK-TRANSFERRING DEVICE FOR MACHINE TOOLS

Application filed June 28, 1927, Serial No. 202,073, and in Germany July 21, 1926.

My invention relates to machine tools, and more particularly to automatic machine tools for the manufacture of hexagonal and other nuts or, generally spoken, prismatic bodies. It is an object of my invention to reduce to a minimum the handling required between the several operations required in their manufacture.

To this end I provide an automatic transferring mechanism which, after the completion of an operation at one station, presents the work to the following station in the proper position and without any handling.

In the manufacture of turned hexigonal nuts or the like as heretofore performed, the nuts, after having been faced, reamed and parted, are dropped freely, necessitating their being taken up separately, cleaned from chips, oil and other adhering matter, and then chucked for the next operation. As a rule the nuts are tapped after parting because, notwithstanding the desirability of performing this operation while the nut is still on the supply rod, it involves practical difficulties. But the amount of handling is obviously increased by the necessity of providing a separate tapping station, and of presenting the workpiece at that station.

The problem of eliminating any handling of the tool is not easily solved, as the work piece after rotation is not arrested in a predetermined position and therefore cannot be engaged by a transferring mechanism without having first been adjusted.

This difficulty is overcome according to the present invention through the medium of a specially designed transferring mechanism which completely eliminates handling of partly finished work pieces and renders the machine altogether automatic, the supply rod or the like being introduced at one end, and the completely finished bodies being delivered at the other.

In order to overcome the difficulties connected with the rotation of the work as referred to above, I provide means on my transferring mechanism by which the work is received on an arbour in the position in which its rotation has been arrested, whatever that position may be, and is then rotated, while on the arbour, into a definite position so as to enable it to enter a recess of the mechanism which is configurated in accordance with the shape of the work, for instance hexagonal, so that the work is held and presented to the tool at the following station in a definite position.

The part or guide of the transferring mechanism by which the work piece is adjusted on its arbour so as to enable it to enter the prismatic recess in the transferring mechanism, is resilient and gradually engages and rotates the work piece into the desired position. Damage to any part of the machine is prevented in case the mechanism should fail to adjust the work properly as the guide can yield in such cases.

As mentioned above, nuts of any shape, either hexagonal, or square, etc., and in general prismatic bodies of any kind may be transferred as described.

In the drawings affixed to this specification and forming part thereof, an automatic machine tool for making hexagonal nuts embodying my invention is illustrated diagrammatically by way of example.

In the drawings,

Fig. 1 is an end elevation of that part of the machine tool to which my improved transferring mechanism is adapted, showing the mechanism in the position in which it presents the work at a station after removing it from the preceding station, Fig. 2 is a similar elevation showing the mechanism in the position in which it receives the work at another station, Fig. 3 is a plan view of the parts illustrated in Figs. 1 and 2, Figs. 4 to 9 illustrate details of the mechanism and various stages of its operation, drawn to a larger scale, Fig. 4 is an elevation showing the arbour end of the transfer mechanism viewed in the direction of the arrow IV in Fig. 2, Fig. 5 is an end elevation of the arbour end viewed from the left in Fig. 4, Figs. 6, 7, 8 and 9 are sections on the line VI—VI in Fig. 5 illustrating various positions of the arbour.

Referring now to Figs. 1, 2 and 3, $a$ is the frame of the machine tool in which is formed a bearing 1 for the arbour on which the work 2, in the present instance is a hexagonal nut, is chucked for facing one of its ends, and for boring and parting, 3 being the parting tool which is operated by any suitable mechanism (not shown). *b* is a bracket secured on the frame *a* and supporting a bearing *c* for a countersinking tool 27, the spindle of which is rotated through the medium of a pulley 4. Any other operation may be performed at the stations 1 and *c*, such as for instance tapping, slotting, etc.

5 is a shaft which is slidably carried in the frame *a* and to which reciprocation and rotation are imparted by any suitable automatic means (not shown but well known in this art). The mechanism for transferring the work piece from station 1 to station *c* is supported on this shaft and comprises an arm 6 in which an arbour 19 is carried, and a arm 9 extending on the side of the shaft which is opposite the arm 6. The arm 6 and the arm 9 are provided with adjustable checks 8 and 10 respectively by which the mechanism is arrested in each of its final positions. *d* is a bracket secured on the bracket *b* and provided with a downwardly projecting extension 7 which presents abutting faces at right angles for the checks 8 and 10.

11 is a bushing inserted in the end of the transferring arm 6 in which the arbour 19 is adapted to reciprocate. 22 is a spring catch in an extension 11' at the outer end of the bushing 11, and 20 and 21 are annular grooves in the arbour 19 which are adapted to be engaged by the spring catch so as to hold the arbour in two positions. The inner end of the arbour is reduced at 19' to receive the nut 2 from the station 1. 11'' is a recess in the inner end of the bushing 11 which is configurated in conformity with the configuration of the work, in the present instance, hexagonal. The wall of the bushing is cut away at 12 in parallel to one of the faces of the nut as shown in Fig. 5.

17 is a guide having curved faces 25 and 26 along its lower edge and fulcrumed at 14 on a bracket 18' which is secured to the frame *a* by any suitable means, not shown. The bracket 18', with the parts connected therewith, is not shown in the plan view, Fig. 3. 15 is a spring buffer in the bracket 18', 14' is a double-armed lever which is keyed to the fulcrum 14, and may be integral with the guide 17, and 16 is an adjustable check on a lug projecting downwardly from the bracket 18'. The pressure of the spring buffer 15 holds the depending arm of the lever 14' against the check 16, and the position of the guide 17 with respect to the nut 2 may be varied by adjusting the check. 18 is a substantially sector-shaped abutment on the outer side of the bracket 18' which is curved concentrically with the axis of the shaft 5.

23 is a, preferably adjustable, abutment secured in the bracket *d* at the station *c* in such a position that the outer end of the arbour 19 is adapted to engage the inner face of the abutment when the transferring mechanism is in the position illustrated in Fig. 1, and the arbour 19 is pushed back into the bushing 11 when the shaft 5 is moved in outward direction. This position of the arbour is illustrated in Fig. 9 and it will appear that in this position the outer groove 21 in the arbour is engaged by the spring catch 22.

A tool, for instance, a drill 24, is indicated diagrammatically at the station 1, and shown in retracted position.

The operation of the transferring mechanism may be subdivided into three stages beginning with the position illustrated in Fig. 2 after an operation at the station 1 has been performed. During the first stage, the transferring mechanism is moved inwardly, causing the reduced end 19' of its arbour to enter the hole in the nut 2. During the second stage, the work is pushed into the recess 11'' while the transferring mechanism is being rotated from station 1 to station *c*, and during the third stage, at the station *c*, the arbour 19 is pushed back by the countersinking tool 27.

After this operation has been completed at the station *c*, and the arbour has been pushed into the position illustrated in Fig. 8 by the tool 27, the transferring mechanism is moved in outward direction into the position illustrated in Fig. 9 in which the outer end of the arbour 19 is engaged by the abutment 23 and pushed back into the bushing 11 from which it projects in the position illustrated in Fig. 8, and the arbour is held in this position by engagement of the spring catch 22 and the groove 21. With the arbour 19 in this position, the transferring mechanism is thrown over into the position illustrated in Fig. 2 in which the axis of the arbour 19 coincides with the axis of the nut 2 at the station 1. The parting tool 3 is advanced but before it has completed its operation, the shaft 5, with the transferring mechanism, is moved inwardly and the reduced end 19' of the arbour 19 is inserted in the hole of the nut 2 as shown in Fig. 6. The nut is now supported on the arbour, and is retained for the present by the parting tool 3 which is still engaging the inner face of the nut 2. The transferring mechanism is now rocked anticlockwise toward the position illustrated in Fig. 1 in which the nut 2 is presented to the countersinking tool 27 at the station *c*. On its way, the nut 2, after having been released by the parting tool 3, is held on the reduced end 19' of the arbour 19 by the abutment 18. At the same time, the nut is engaged by the edges 25 and 26 of the guide 17. It will be understood that, as mentioned above, the nut cannot be arrested in a definite position after it has been tooled but the edges 25 and 26 gradually move it into such a position that it is able to enter the hexagonal recess 11" in the bushing 11. When the nut is in proper position it is gradually forced into the recess 11" by an inward motion of the shaft 5. At the same time, the spring buffer 22 is moved out of the groove 21 but does not yet engage the groove 20, as shown in Fig. 7. When the arbour 19 is in proper position with respect to the tool 27 at the station c, a further inward motion is imparted to the shaft 5 causing the tool 27 to enter the hole of the nut 2 and to push the arbour 19 to the outside until its groove 20 is engaged by the spring catch 22. Upon completion of the operation at the station c, the shaft 5 is moved in outward direction as described, and the abutment 23 pushes the arbour 19 back into the position illustrated in Fig. 9 in which the mechanism is ready for the next cycle of operations.

Means (not shown) may be provided for ejecting the nut after it has been completed at the station c, and to this end a slot 28 may be provided in the end of the arm 6 and the bushing 11, as indicated in Figs. 4 and 5.

Due to the resilient arrangement of the lever 17 seizing or jamming, and consequent damage to any parts of the machine, are prevented, as the guide 17 is able to yield until it has placed a nut in proper position.

It will be understood that I am not limited to the manufacture of hexagonal nuts nor to a sequence of operations not including tapping, as described, for it will be understood that any expert can modify the apparatus and its operation to square nuts, or prismatic bodies of any kind, and to provide for tapping. If tapping is desired it will be necessary to arrange an additional station at which a transfer mechanism is arrested intermediate the stations 1 and c. A tapping spindle will be provided and the nut will be presented first to the countersinking tool and then to the tap. Preferably the tapping mechanism is of the known type in which the nut is free to move across the bent or crank-shaped tap and be ejected at the end of the spindle.

Obviously an additional station, or any number of stations, may be provided for performing other operations, for instance, slotting the heads of screw bolts. In this case, the operation of the guide 17 for adjusting the head in proper position with respect to the recess 11" will be the same as described, whereas instead of the arbour 19 a bore will be provided in the arm 6 for receiving the bolt.

I wish it to be understood that I do not desire to be limited to the exact details of construction shown and described for obvious modifications will occur to a person skilled in the art.

I claim:—

1. A blank-transferring appliance for machine tools having several tooling stations and comprising a gripper head adapted to be successively presented to said tooling stations and having a cavity for the reception of a blank, formed in conformity with the blank, a blank holder in said gripper head adapted to be displaced axially therein and to receive the separated blank in any position with respect to said cavity, means for moving said gripper head from one tooling station to another and means for operating on said blank holder means located in its path of movement for locating the blank in said holder so that it will be ready to be operated on by the tool when it reaches the second tooling station.

2. A blank-transferring appliance for machine tools, having several tooling stations and comprising a gripper head adapted to be successively presented to said tooling stations and having a cavity for the reception of a blank formed in conformity with the blank, a blank holder in said gripper head adapted to be displaced axially therein and to receive the separated blank in any position with respect to said cavity, means for moving said gripper head from one tooling station to another in three stages, and means for operating on said blank holder located in its path of movement and adapted to place the blank on said holder during the first stage, to place said blank in the cavity in said head during the second stage, and to advance said blank toward a part of the machine tool and to retract said blank holder during the third stage.

3. A blank-transferring appliance for machine tools having several tooling stations and comprising a gripper head adapted to be successively presented to said tooling stations and having a cavity for the reception of a blank, formed in conformity with the blank, a blank holder in said gripper head adapted to be displaced axially therein and to receive the separated blank in any position with respect to said cavity, means for moving said gripper head from one tooling station to another in three stages, means for operating on said blank holder located in its path of movement and adapted to place the blank on said holder during the first stage, to place said blank in the cavity in said head during the second stage, and to advance said blank toward a part of the machine tool and to retract said blank holder during the third stage and a spring catch adapted to hold said blank holder in the positions corresponding to the several stages.

In testimony whereof I affix my signature.

KARL TESSKY.